United States Patent Office 3,314,945
Patented Apr. 18, 1967

3,314,945
6-FORMYL PREGNADIENES
Bruno Camerino, Bianca Patelli, and Roberto Sciaky, all of Milan, Italy, assignors to Società Farmaceutici Italia, Milan, Italy, a corporation of Italy
No Drawing. Filed July 12, 1965, Ser. No. 471,450
Claims priority, application Italy, July 15, 1964, 15,418/64
24 Claims. (Cl. 260—239.55)

This application is a continuation-in-part of our copending application Ser. No. 356,642, filed Apr. 1, 1964, now abandoned; and relates to new steroids having antiinflammatory activity and having the formula:

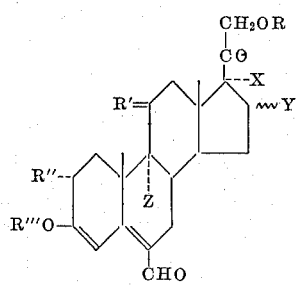

wherein R is an acyl group of a carboxylic acid having up to 9 carbon atoms;
R' is selected from the group consisting of $(\alpha H)\beta Cl$, O, $(\alpha H)\beta OH$, and $(\alpha H)\beta OR$ wherein R has the above meaning;
R" is selected from the group consisting of H and $CH_3$;
R''' is T–A where T is F, Cl, Br and A is a straight (linear) alkylene radical which may be substituted with chlorine and having from 2 to 8 carbon atoms;
X is selected from the group consisting of H and OH;
Y is selected from the group consisting of H, $\alpha OH$, $\alpha CH_3$ and $\beta CH_3$;
X and Y together may form the group

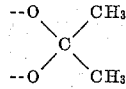

and
Z is selected from the group consisting of F and Cl, and to their process of preparation.

The compounds of our invention are prepared by treating a compound of the formula

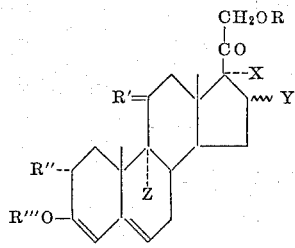

wherein R, R', R", R''', X, Y and Z have the above meaning, with a dialkylformamide and a chlorinating agent and subjecting the product to alkaline hydrolysis. This hydrolysis may be mild, for example with sodium acetate, or stronger to hydrolyze the 21-acyloxy group. Further separation of the resulting compounds may be by crystallization. More in detail, the process of the invention is carried out in the following manner.

The starting steroid is dissolved in a chlorinated organic solvent, such as trichloroethylene, chloroform, dichloroethane, carbon tetrachloride. The solution obtained is reacted with a formamide, such as (a) a dialkylformamide, for example dimethylformamide, diethylformamide, methylethylformamide, or (b) an alkylarylformamide, for example methylphenylformamide, or (c) a cyclic formamide wherein the nitrogen atom is a member of a ring, such as formylpiperidine, and a chlorinating agent selected from the group consisting of phosphorus oxychloride, phosgene, phosphorus pentachloride, thionylchloride and their analogues. The formamide used may be added directly to the solution which contains the starting steroid, or in solution in a chlorinated organic solvent, preferably one of those mentioned above. The reaction is carried out at room temperature over a period of time ranging from 1 to 5 hours.

The reaction mixture obtained is submitted to mild alkaline hydrolysis, preferably with an aqueous solution of sodium acetate, and the products obtained are isolated by extraction with a solvent and further purification, preferably by crystallization from a suitable organic solvent.

The compounds of the invention having the above formula wherein R''' is Cl—$CH_2$—$CH_2$— may be also prepared by the process as above described, but using as starting product a compound of the formula:

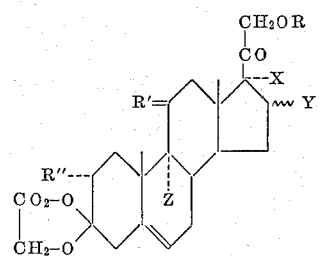

wherein R, R', R", X, Y and Z have the above meaning, and operating at from 40° to 80° C.

The presence of hydroxy-groups in the 11- and/or 17-position of the starting steroids does not interfere with the formation of the corresponding 6-formyl-derivative and the final products isolated from the reaction mixture have the starting 11- and/or 17-hydroxy-groups unreacted. Only if 9α-fluoro-hydrocortisone-3-ethylene-ketal-21-acetate is used as the starting material, is there a concomitant reaction of the 11-hydroxy-group. In this case a mixture of 9α-fluoro-6-formyl-3-(2'-chloroethoxy)-3,5-pregnadien-11β,17α,21-triol-20-one-21-acetate and its 11-formate is obtained. The two products then have to be separated. The yield turns in favor of one or other of the two products depending on the temperature at which the reaction is carried out. 9α-fluoro-6-formyl-3-(2'-chloroethoxy)-3,5-pregnadien-11β,17α,21-triol-20-one - 21 - acetate is preferentially obtained by operating at from 40° to 50° C., while 9α-fluoro-6-formyl-3-(2'-chloroethoxy) - 3,5 - pregnadien-11β,17α,21-triol-20-one-11-formate-21-acetate is preferentially obtained at from 50° to 80° C.

The products obtained according to the process of the invention may be, if desired, transformed into the corresponding 21-hydroxy-derivatives by hydrolyzing the corresponding 21-acyloxy-derivatives.

Typical products obtained by the process of our invention are:

3-(2'-chloroethoxy)-9α-fluoro-6-formyl-3,5-pregnadien-11β,17α,21-triol-20-one-21-acetate;
3-(2'-chloroethoxy)-9α-fluoro-6-formyl-3,5-pregnadien-11β,17α,21-triol-20-one-11-formate-21-acetate;
3-(2'-chloroethoxy)-6-formyl-9α-fluoro-3,5-pregnadien-17α,21-diol-11,20-dione-21-acetate;
3-(2'-chloroethoxy)-6-formyl-9α-fluoro-3,5-pregnadien-11β,16α,17α,21-tetrol-20-one-21-acetate-16α,17α-acetonide;
3-(2'-chloroethoxy)-6-formyl-9α-fluoro-3,5-pregnadien-11β,17α,21-triol-20-one-11β,21-diacetate;

3-(2'-chloroethoxy)-6-formyl-16α-methyl-9α-fluoro-3,5-pregnadien-11β,17α,21-triol-20-one-21-acetate;
3-(2'-chloroethoxy)-6-formyl-16β-methyl-9α-fluoro-3,5-pregnadien-11β,17α,21-triol-20-one-21-acetate;
3-(2'-chloroethoxy)-6-formyl-9α,11β-dichloro-3,5-pregnadien-17a,21-diol-20-one-21-acetate;
3-(2'-chloroethoxy)-6-formyl-9α-chloro-3,5-pregnadien-11β,17α,21 triol-20-one-21-acetate;
2α-methyl-3-(2'-chloroethoxy)-6-formyl-9α-fluoro-3,5-pregnadien-11β,17α,21-triol-20-one-21-acetate;
2α-methyl-3-(2'-chloroethoxy)-6-formyl-9α-chloro-3,5-pregnadien-11β,17α,21-triol-20-one-21-acetate;
3-(2'-chloroethoxy)-6-formyl-9α-fluoro-3,5-pregnadien-11β,21-diol-20-one-21-acetate;
3-(2'-chloroethoxy)-6-formyl-9α-fluoro-3,5-pregnadien-21-ol-11,20-dione-21-acetate;
2α-methyl-3-(2'-chloroethoxy)-6-formyl-9α-fluoro-3,5-pregnadien-11β,21-diol-20-one-21-acetate;
2α-methyl-3-(2'-chloroethoxy)-6-formyl-9α-fluoro-3,5-pregnadien-21-ol-11,20-dione-21-acetate;
2α-methyl-3-(2'-chloroethoxy)-6-formyl-9α-fluoro-3,5-pregnadiene-11β,16α,17α,21-tetrol-20-one-21-acetate-16α,17α-acetonide;
2α-methyl-3-(2'-chloroethoxy)-6-formyl-9α-fluoro-3,5-pregnadiene-16α-methyl-11β,17α,21-triol-20-one-21-acetate;
3-(2'-chloroethoxy)-6-formyl-9α-chloro-16α-methyl-11,20-dione-21-ol-21-acetate;
3-(2'-chloroethoxy)-6-formyl-9α,11β-dichloro-16α,17α,21-triol-20-one-21-acetate-16α,17α-acetonide;
3-(2'-bromoethoxy)-6-formyl-9α-fluoro-$\Delta^{3,5}$-pregnadien-17α,21-diol-11,20-dione-21-acetate;
3-(2'-fluoroethoxy)-6-formyl-9α-fluoro-$\Delta^{3,5}$-pregnadien-17α,21-diol-11,20-dione-acetate;
3-(4'-chlorobutoxy)-6-formyl-9α-fluoro-$\Delta^{3,5}$-pregnadien-17α,21-diol-11,20-dione-21-acetate;
3-(2',3'-dichloropropoxy)-6-formyl-9α-fluoro-$\Delta^{3,5}$-pregnadien-17α,21-diol-11,20-dione-21-acetate;
3-(2'-fluoroethoxy)-6-formyl-9α,11β-dichloro-$\Delta^{3,5}$-pregnadien-17α,21-diol-20-one-21-acetate;
3-(2'-fluoroethoxy)-6-formyl-9α-fluoro-$\Delta^{3,5}$-pregnadien-11β,16α,17α,21-tetrol-20-one-16,17-acetonide-21-acetate;
3-(4'-chlorobutoxy)-6-formyl-9α-chloro-$\Delta^{3,5}$-pregnadien-11β,17α,21-triol-20-one-21-acetate;
3-(2'-bromoethoxy)-6-formyl-9α-chloro-$\Delta^{3,5}$-pregnadien-11β,17α,21-triol-20-one-21-acetate.

Typical products of the present invention are also other 21-acyl derivatives, where in the acyl is the radical of an organic carboxylic acid having no more than 9 carbon atoms, particularly the 21-propionate, 21-butyrate, 21-valerianate, 21-caproate, 21-octanoate, 21-cyclopentyl-propionate and the corresponding acyl derivatives of 11-hydroxy compounds.

The products of our invention display a good antiinflammatory, antirheumatic and antiallergic activity without showing side effects and are useful in veterinary therapy.

The clinical indications are preferably: skin diseases, eczema, psoriasis, urticaria, allergic syndromes, rheumatic arthritis, articular rheumatism, uratic arthritis, nephrosic syndromes, conjunctivities, ophthalmia, synovitis and shock states. The therapeutic applications in the veterinary field are preferably: articular rheumatism, allergic skin diseases, eczema, urticaria, itchings in general, shock states, synovitis, tenosynovitis, asthmatic and acute bronchitis, conjunctivitis and keratitis.

The products of the invention may be administered by the parenteral, oral or topical route. The therapeutic compositions comprise one of the products of our invention with a pharmaceutically acceptable liquid or solid vehicle. The compositions may be prepared as sterilized solutions, tablets, powders, ointments, solutions or emulsions. Excipients may be employed among which the most suitable are starch, lactose, talc, magnesium stearate and their analogues.

The following examples are to illustrate, but not to limit, the invention:

EXAMPLE 1

*3-(2'-chloroethoxy)-9α-fluoro-6-formyl-3,5-pregnadien-11β-17α,21-triol-20-one-21-acetate*

5 g. of 9α-fluoro-hydrocortisone-21-acetate were heated in 500 cc. of anhydrous benzene and 40 cc. of ethylene glycol. After evaporation of the first runnings and addition of 0.150 g. of p-toluenesulfonic acid, the mixture was refluxed for 6 hours. 1 cc. of pyridine was added. The mixture was washed with salt water, then with sodium bicarbonate and finally with water. After evaporation of the solvent, the residue was dried. By crystallization from acetone-petroleum ether, 2.8 g. of 9α-fluoro-hydrocortisone-3-ethyleneketal-21-acetate, melting at 215–218° C., were obtained.

4 cc. of trichloroethylene and 0.5 cc. of dimethylformamide were loaded into a 50 cc. flask, provided with a refrigerant, a separating funnel and a stirrer. The mixture was cooled to 0° C., 0.5 cc. of phosphorus oxychloride were slowly added, the mixture was stirred for 30 minutes at room temperature, and 2 cc. of dimethylformamide, 1 g. of 9α-fluoro-hydrocortisone-3-ethyleneketal-21-acetate prepared as just described above and 2 cc. of trichloroethylene were added. The mixture was heated to 50° C. for 3 hours; it was then cooled with an ice-bath, and 1 g. of sodium acetate in 3 cc. of water was added. The mixture was extracted with ethyl acetate, washed with a solution of sodium bicarbonate, with water, and dried over sodium sulfate. The solvent was distilled off in vacuo, and by crystallization of the residue from acetone-petroleum ether, 0.50 g. of 9α-fluoro-6-formyl-3-(2'-chloroethoxy) - 3,5 - pregnadien - 11β,17α,21-triol-20-one-21-acetate, melting at 195°–197° C., were obtained:

$$\lambda_{max.}^{C_2H_5OH} = 325 \text{ m}\mu \ (\epsilon = 16,230)$$

and $$\lambda_{max.}^{C_2H_5OH} = 220 \text{ m}\mu \ (\epsilon = 8,520)$$

EXAMPLE 2

*3-(2'-chloroethoxy)-9α-fluoro-6-formyl-3,5-pregnadien-11β,17α,21-triol-20-one-11-formate-21-acetate*

The preparation was carried out as in Example 1 with the difference that the chlorination reaction mixture was heated to 70° C. instead of 50° C. From the crude residue, thus obtained, dissolved in acetone, 0.25 g. of the product melting at 133°–135° C., precipitated on the addition of petroleum ether;

$$\lambda_{max.}^{C_2H_5OH} = 325 \text{ m}\mu \ (\epsilon = 16,400)$$

and $$\lambda_{max.}^{C_2H_5OH} = 220 \text{ m}\mu \ (\epsilon = 8,700)$$

EXAMPLE 3

*9α - fluoro - 6 - formyl - 3 - (2'-chloroethoxy)-3,5-pregnadiene - 11β,17α,21 - triol - 20 - one - 21 - acetate and nadien - 11β.17α,21 - triol - 20 - one 21 - acetate and 9α - fluoro - 6 - formyl - 3 - (2'-chloroethoxy)-3,5-pregnadien - 11β,17α,21-triol-20-one-11-formate-21-acetate*

A residue, containing a mixture of the above two compounds, was obtained by operating as in Example 1, but keeping the temperature of the chlorination reaction mixture at 60° C. By fractional crystallization from acetone-petroleum ether, first 9α-fluoro-6-formyl-3-(2'-chloroethoxy) - 3,5 - pregnadien - 11β,17α,21 - triol - 20-one - 21 - acetate precipitated and then 9α - fluoro - 6-formyl-3-(2' - chloroethoxy) - 3,5 - pregnadien - 11β,17α, 21 - triol - 20 - one - 11 - formate - 21 acetate followed.

EXAMPLE 4

3-(2'-chloroethoxy)-6-formyl-9α-fluoro-3,5-pregnadien-17α,21-diol-11,20-dione-21-acetate 7.5 g. of 9α-fluoro-cortisone-21-acetate, dissolved in 125 cc. of anhydrous dioxane and 7.5 cc. of ethyl orthoformate were loaded into a 500 cc. flask and 110 mg. of p-toluenesulfonic acid and 8.5 cc. of ethylene glycol were added. The mixture was refluxed on an oil bath at 100–110° C. for 8 hours. During the reaction, a crystalline product precipitated from the yellow solution and after cooling it was filtered. 5.55 g. of 3-cycloethyleneketal of 9α-fluoro-cortison-21-acetate melting at 295–300° C. (with decomposition) were obtained. By concentration of the mother liquors to a small volume, in vacuo, 0.81 g. of crude ketal, melting at 275–280° C. (with decomposition), were further obtained.

16 cc. of trichloroethylene and 2 cc. of dimethylformamide were loaded into a 100 cc. flask, provided with an agitator. After cooling the flask to 0° C., 2 cc. of phosphorus oxychloride, $POCl_3$, were added and the mixture was stirred for 30 minutes at room temperature. Then still with stirring, 4 g. of a mixture of the purer and the crude 3-ketal of 9α-fluoro-cortisone-21-acetate prepared as described above and then 8 cc. of dimethylformamide and 8 cc. of trichloroethylene were added. The mixture was heated for 3 hours to 70° C. After cooling, 4 g. of sodium acetate in 12 cc. of water were added to the solution obtained. The solution was diluted with water and extracted with ethyl acetate. The extracts were washed with water, with a 10% aqueous sodium bicarbonate solution and finally with water to neutrality. The resulting solution was dried over sodium sulfate and evaporated in vacuo. The solid product was crystallized from acetone. 1.85 g. of yellow crystals, melting at 240–247° C., were obtained. By recrystallization from acetone, a pure product, melting at 250–252° C., was obtained;

$\lambda_{max.}^{C_2H_5OH}$ at 220 and 323 mμ; $\epsilon = 10,600-12,800$.

EXAMPLE 5

3-(2'-chloroethoxy)-6-formly-9α-fluoro-3,5-pregnadien-11β,16α,17α,21-tetrol-20-one-21-acetate-16α,17α-acetonide 4.8 g. of 9α-fluoro-4-pregnene-11β,16α,17α,21-tetrol-3,20-dione-21-acetate-16α,17α-acetonide, melting at 248–250° C. and prepared by acetylation of the corresponding 21-alcohol (J. Amer. Chem. Soc., 1959, 81, page 1689), were refluxed for 20 hours with 80 cc. of dioxane, 5.2 cc. of ethylene glycol, 4.8 cc. of ethyl orthoformate and 60 mg. of p-toluenesulfonic acid. After cooling, 0.6 cc. of pyridine were added and the mixture was concentrated in vacuo, diluted with ethyl acetate, poured into a separatory funnel, and washed with water, with a solution of 5% aqueous sodium bicarbonate and then with water to neutrality. After distilling off the solvent, a residue of 5.5 g. remained, which was dissolved in benzene and chromatographed over 100 g. of Florisil (registered trademark) chromatographic adsorbent. 3 g. of 9α-fluoro-5-pregnene-11β,16α,17α,21-tetrol-3,20-dione-21-acetate-3-ethyleneketal-16α,17α-acetonide, melting at 145–147° C., were collected from the fractions eluted with benzene-ether 9:1.

1 g. of this 9α-fluoro-5-pregnene-11β,16α,17α,21-tetrol-3,20-dione-21-acetate-3-ethyleneketal-16α,17α-acetonide in 2 cc. of dimethylformamide and 2 cc. of trichloroethylene was heated for 3 hours on an oil bath at 70° C. with the reagent obtained from 0.5 cc. of dimethylformamide in 4 cc. of trichloroethylene with 0.5 cc. phosphorus oxychloride. After cooling to 0° C., 1 g. of sodium acetate dissolved in 3 cc. of water were slowly added with stirring. The mixture was extracted with ethyl acetate and the extracts were washed with water, with a 5% aqueous solution of sodium bicarbonate, and then with water to neutrality. On distillation of the solvent 1.1 g. of a residue was obtained from which, after dissolution in ether and precipitation with petroleum ether, 0.500 g. of 3-(2'-chloroethoxy)-6-formyl-9α-fluoro-3,5-pregnadien-11β,16α,17α,21-tetrol-20-one-21-acetate-16α17α-acetonide, melting at 180–182° C. were obtained;

$\lambda_{max.}^{C_2H_5OH}$ at 325 mμ; $\epsilon = 14,340$.

EXAMPLE 6

3-(2'-chloroethoxy)-6-formyl-9α-fluoro-3,5-pregnadien-11β,17α,21-triol-20-one-11β,21-diacetate 1.2 g. of 9α-fluoro-5-pregnene-11β,17α,21-triol-3,20-dione-11β,21-diacetate-3-ethyleneketal, melting at 198–200° C. and obtained by refluxing 9α-fluoro-hydrocortisone-11,21-diacetate (J. Amer. Chem. Soc. (1960) 82, p. 2580) with ethylene glycol in benzene and p-toluenesulfonic acid, were reacted for 3 hours on a thermoregulated bath at 70° C. in 2 cc. of dimethylformamide and 2 cc. of trichloroethylene with the reagent obtained from 0.5 cc. of dimethylformamide in 4 cc. of trichloroethylene and 0.5 cc. of phosphorus oxychloride. After cooling to 0° C., 1 g. of sodium acetate in 3 cc. of water was slowly added with stirring and the mixture was extracted with ethyl acetate. The extracts were washed with water, with a 5% aqueous solution of sodium bicarbonate and then with water to neutrality. The residue was collected with diethyl ether and the product was separated by filtration. 3-(2'-chloroethoxy)-6-formyl-9α-fluoro-3,5-pregnadien-11β,17α,21-triol-20-one-11β,21-diacetate, melting at 143–145° C., was obtained;

$\lambda_{max.}^{C_2H_5OH}$ at 325 mμ, $\epsilon = 16,230$.

EXAMPLE 7

3-(2'-chloroethoxy)-6-formyl-16α-methyl-9α-fluoro-3,5-pregnadien-11β,17α,21-triol-20-one-21-acetate 2.4 g. of 9α-fluoro-16α-methyl-5-pregnen-11β,17α,21-triol-3,20-dione-21-acetate-3-ethyleneketal, prepared by ketalization of 9α-fluoro-16α-methyl-hydrocortisone-21-acetate (J. Amer. Chem. Soc. (1958), 80, p. 3161) with ethylene glycol and benzene in the presence of a catalytic quantity of p-toluenesulfonic acid, were reacted for 3 hours at 70° C. in 4 cc. of dimethylformamide and 4 cc. of trichloroethylene with the reagent obtained from 1 cc. of dimethylformamide in 8 cc. of trichloroethylene and 1 cc. of phosphorus oxychloride. After cooling to 0° C., and decomposition with 10 cc. of 30% sodium acetate solution, the mixture was extracted with ethyl acetate. The extracts collected were washed with water, then with 5% aqueous sodium bicarbonate solution and finally with water to neutrality. The solution was evaporated to dryness. The residue, taken up with diethyl ether, yielded 3-(2'-chloroethoxy)-6-formyl-9α-fluoro-16α-methyl-3,5-pregnadien-11β,17α,21-triol-20-one-21-acetate, which in the U.V. spectrum presents $\lambda_{max.}^{C_2H_5OH}$ at 220 and 325 mμ melting at 228°–230° C.

By operating in the same way, but using as starting material 9α-fluoro-16β-methyl-hydrocortisone-21-acetate (J. Amer. Chem. Soc. (1960), 82, p. 4012), 3-(2'-chloroethoxy)-6-formyl-16β-methyl-9α-fluoro-3,5-pregnadien-11β,17α,21-triol-20-one-21-acetate, having $\lambda_{max.}^{C_2H_5OH}$ at 220 and 325 mμ was obtained.

EXAMPLE 8

3-(2'-chloroethoxy)-6-formyl-9α,11β-dichloro-3,5-pregnadien-17α,21-diol-20-one-21-acetate 7.3 g. of 9α,11β-dichloro-4-pregnen-17α,21-diol-3,20-dione-21-acetate (J. Amer. Chem. Soc. (1960), 82, p.

4005) were dissolved in 120 cc. of dioxane and 7.5 cc. of ethyl orthoformate. 10 cc. of ethylene glycol and 100 mg. of p-toluenesulfonic acid were added to the solution. The reaction mixture was refluxed for 24 hours; 1 cc. of pyridine was added and the mixture was concentrated in vacuo to a small volume. The residue was diluted with water and the steroid was extracted with ethyl acetate. The organic extracts were washed with water, dried over anhydrous sodium sulfate and evaporated to dryness. The residue crystallized from acetone, yielded 9α,11β-dichloro - 5 - pregnen - 17α,21 - diol - 3,20 - dione - 21-acetate-3-ethyleneketal, melting at 198–200° C.

To 1.2 cc. of dimethylformamide and 1 cc. of trichloroethylene, which were cooled to 0° C., 0.6 cc. of phosphorus oxychloride were added with stirring and the mixture was stirred at room temperature for 30 minutes. To the reagent, prepared in this manner, 1 g. of 9α,11β-dichloro-5 - pregnen - 17α,21 - diol - 3,20 - dione - 21 - acetate - 3-ethyleneketal dissolved in 7 cc. of trichloroethylene were added. The mixture was stirred for 3 hours at 65° C. and then cooled on ice. 1.3 g. of sodium acetate in 20 cc. of water were added with stirring. The steroid was extracted with ethyl acetate. The organic extracts were washed with water, dried over anhydrous sodium sulfate and evaporated to dryness. The residue, recrystallized from acetone-petroleum ether, yielded 3-(2'-chloroethoxy) - 6 - formyl - 9α,11β - dichloro - 3,5 - pregnadien-17α,21-diol-20-one-21-acetate, melting at 238–240° C.;

$\lambda_{max.}^{C_2H_5OH}$ 220 and 324 m$\mu$

EXAMPLE 9

3-(2'-chloroethoxy)-6-formyl-9α-chloro-3,5-pregnadien-11β,17α,21-triol-20-one-21-acetate 1 g. of 9α-chloro-5-pregnen-11β,17α,21-triol-3,20-dione-21-acetate-3-ethyleneketal obtained from 9α-chloro-4-pregnen-11β,17α,21-triol-3,20-dione-21-acetate (J. Amer. Chem. Soc. (1953), 75, p. 2273) was treated with the reagent dimethylformamide and phosphorus oxychloride prepared as described in Example 1. The reaction mixture was kept at 50° C. with stirring for 3 hours. After extraction and crystallization from acetone-ether, 3-(2'-chloroethoxy) - 6 - formyl - 9α - chloro - 3,5 - pregnadien-11β,17α,21-triol-20-one-21-acetate, melting at 198–200° C., was obtained;

$\lambda_{max.}^{C_2H_5OH}$ 220 and 320 m$\mu$

EXAMPLE 10

2α-methyl-3-(2'-chloroethoxy)-6-formyl-9α-fluoro-3,5-pregnadien-11β,17α,21-triol-20-one-21-acetate 2α - methyl - 9α - fluoro - 4 - pregnen - 11β,17α,21-triol-3,20-dione-21-acetate (J. Amer. Chem. Soc. (1955), 77, p. 6401) was treated in dioxane with ethyl orthoformate, ethylene glycol and p-toluenesulfonic acid as a catalyst to yield 2α - methyl - 9α - fluoro - 5 - pregnen-11β,17α,21 - triol - 3,20 - dione - 21 - acetate - 3 - ethyleneketal. 1 g. of this 2α - methyl - 9α - fluoro - 5 - pregnen-11β,17α,21-triol-3,20-dione-21-acetate-3-ethyleneketal was treated with dimethylformamide and phosphorus oxychloride, and the reaction mixture was kept at 50° C. for 8 hours. After extraction, 2α - methyl - 3 - (2'-chloroethoxy) - 6 - formyl - 9α - fluoro - 3,5-pregnadien-11β,17α,21-triol-20-one-21-acetate was crystallized from acetone-ether, melting at 155–160° C.;

$\lambda_{max.}^{C_2H_5OH}$ 220 and 325 m$\mu$

EXAMPLE 11

2α-methyl-3-(2'-chloroethoxy)-6-formyl-9α-chloro-3,5-pregnadien-11β,17α,21-triol-20-one-21-acetate 2α - methyl - 9α - chloro - 4 - pregnen - 11β,17α,21-triol-3,20-dione-21-acetate (J. Clin. End. Met. (1956), 16, p. 1631) was treated in dioxane with ethyl orthoformate, ethylene glycol and p-toluenesulfonic acid as a catalyst to yield 2α-methyl-9α-chloro-5-pregnen-11β,17α,21-triol-3,20-dione-21-acetate-3-ethyleneketal. By operating as described in Example 1, this material was converted into 2α - methyl - 3 -(2' - chloroethoxy) - 6 - formyl - 9α-chloro - 3,5 - pregnadien - 11β,17α,21 - triol - 20 - one - 21-acetate. The product obtained had $\lambda_{max.}^{C_2H_5OH}$ at 221 and 324 m$\mu$

EXAMPLE 12

3-(2'-chloroethoxy)-6-formyl-9α-fluoro-3,5-pregnadien-11β,21-diol-20-one-21-acetate 9α - fluoro - 4 - pregnen - 11β,21 - diol - 3,20 - dione - 21-acetate (J. Amer. Chem. Soc. (1955), 77, p. 1068) was dissolved in anhydrous benzene. Ethylene glycol had a catalytic quantity of p-toluenesulfonic acid were added and the mixture was refluxed for 15 hours. After cooling and addition of pyridine the mixture was washed with water and dried. By evaporation of the solvent at reduced pressure and crystallization of the residue, 9α-fluoro - 5 - pregnen - 11β,21 -diol - 3,20 - dione - 21-acetate-3-ethyleneketal was obtained.

0.6 g. of this 9α-fluoro-5-pregnen-11β,21-diol-3,20-dione-21-acetate-3-ethyleneketal, dissolved in 2 cc. of dimethylformamide, was added to the reagent prepared from 2 cc. of dimethylformamide in 1 cc. of anhydrous trichloroethylene and 0.5 cc. of phosphorus oxychloride, and heated to 50° C. for 4 hours. After cooling, the reaction mixture was treated with 1.2 g. of sodium acetate in 10 cc. of water and after 15 minutes extracted with ethyl acetate, washed with water and dried. After evaporation of the solvent, 3-(2'-chloroethoxy)-6-formyl-9α-fluoro -3,5 - pregnadien - 11β,21 - diol - 20 - one - 21-acetate, having $\lambda_{max.}^{C_2H_5OH}$ at 221 and 323 m$\mu$ was obtained by crystallization from anhydrous ether-petroleum ether.

EXAMPLE 13

3-(2'-chloroethoxy)-6-formyl-9α-fluoro-3,5-pregnadien-21-ol-11,20-dione-21-acetate 9α - fluoro - 4 - pregnen - 21 - ol - 3,11,20 - trione - 21-acetate (J. Amer. Chem. Soc. (1955), 77, p. 1068) dissolved in anhydrous benzene was treated with ethylene glycol and a catalytic quantity of p-toluenesulfonic acid as described in Example 5 to yield 9α-fluoro-5-pregnen-21-ol-3,11,20-trione-21-acetate-3-ethyleneketal which in turn was treated with the reagent dimethylformamide and phosphorus oxychloride prepared as in Example 5, to yield 3 - (2' - chloroethoxy - 6 - formyl-9α-fluoro-3,5-pregnadien - 21 - ol - 11,20-dione-21-acetate, melting at 147–150° C.;

$\lambda_{max.}^{C_2H_5OH}$ 225 m$\mu$ ($\epsilon$=8,100) and 326 m$\mu$; ($\epsilon$=13,200).

EXAMPLE 14

3-(2'-bromoethoxy)-6-formyl-9α-fluoro-Δ-3,5-pregnadien-17α,21-diol-11,20-dione-21-acetate 1 cc. of β-bromoethyl orthoformate and a mixture of dioxane-concentrated sulfuric acid prepared by adding 0.04 cc. of concentrated $H_2SO_4$ to 0.7 cc. of anhydrous dioxane were added to a suspension of 1 g. of 9α-fluorocortison-21 acetate (J. Am. Chem. Soc. 76, 1954, p. 1455) in 5 cc. of anhydrous dioxane. The suspension was kept under weak stirring for 45 minutes at room temperature. To the green-brown solution thus obtained, 0.2 cc. of pyridine were added and the mixture was diluted with water. The suspension was extracted with ethyl acetate, the organic extracts were washed with water, dried over anhydrous sodium sulfate and evaporated in vacuo. A yellow oil was obtained which crystallizes by adding ether-petroleum ether. 0.87 g. of 3-(2'-bromoethoxy)-9α- fluoro-$\Delta^{3,5}$-pregnadien-17α,21-diol-11,20-dione-21 - acetate were obtained. To a solution cooled to 0° C. of 3 cc. of trichloroethylene and 0.35 cc. of dimethylformamide, 0.35 cc. of $POCl_3$ were added and it was stirred for 30 minutes at room temperature. Always under stirring, 0.67 g. of 3-(2'-bromoethoxy)-9α-fluoro-$\Delta^{3,5}$-pregnadien-17α, 21-diol-11,20-dione-21-acetate, 1.4 cc. of dimethylformamide and 1.5 cc. of trichloroethylene were added. The mixture was stirred for 4 hours at room temperature. After cooling to 0° C., 0.7 g. of sodium acetate in 3 cc. of water were added to the solution, under stirring for 30 minutes. The solution was diluted with water and extracted with ethyl acetate. The extracts were washed with water, with 10% $NaHCO_3$ solution and with water to neutrality, then dried over $Na_2SO_4$ and evaporated in vacuo. 0.580 g. of a yellow solid were obtained, which on recrystallization from acetone-petroleum ether, yields 0.250 g. melting at 238–243° C.

The analytic sample melts at 240–243° C. (with decomposition);

$\lambda_{max.}^{ethanol}$ 225, 330 m$\mu$; $\epsilon$=9900, 15,700.

EXAMPLE 15

*3-(2'-fluoroethoxy)-6-formyl-9α-fluoro-$\Delta^{3,5}$-pregnadien-17α,21-diol-11,20-dione-21-acetate*

The intermediate 3 - (2'-fluoroethoxy)-9α-fluoro-$\Delta^{3,5}$-pregnadien-17α,21-diol-11,20-dione-21acetate melting at 84–87° C. was prepared from 9α-fluoro-cortisone-21-acetate by operating as in Example 14 using β-fluoroethyl orthoformate instead of β-bromoethyl orthoformate. To a solution cooled to 0° C. of 4.4 cc. of trichloroethylene and 0.55 cc. of dimethylformamide, 0.55 cc. of $POCl_3$ were added and stirred for 30 minutes at room temperature. Always under stirring, 1.09 g. of 3-(2'-fluoroethoxy)-9α-fluoro - $\Delta^{3,5}$ - pregnadien - 17α,21-diol-11,20-dione-21-aetate dissolved in 20 cc. of trichloroethylene containing 0.1 cc. of pyridine were added. The mixture was stirred for 4 hours at room temperature. After cooling to 0° C., 1.1 g. of sodium acetate in 3.5 cc. of water were added to the solution and stirred for 30 minutes. The solution was diluted with water and then the preparation was carried out as in Example 14. 1.1 g. of the solid compound was obtained, which was recrystallized from acetone-petroleum ether.

The analytic sample melts at 235–238° C.

$\lambda_{max.}^{ethanol}$ 220, 324 m$\mu$; $\epsilon$=10,900, 16,300.

EXAMPLE 16

*3-(4'-chlorobutoxy)-6-formyl-9α-fluoro-$\Delta^{3,5}$-pregnadien-17α,21-diol-11,20-dione-21-acetate*

The intermediate 3-(4'-chlorobutoxy)-9α-fluoro-$\Delta^{3,5}$-pregnadien-17α,21-diol-11,20-dione-21-acetate was prepared from 9α-fluoro-cortisone-21-acetate and 4-chlorobutyl orthoformate by operating as in Example 14. To a solution cooled to 0° C. of 4 cc. of trichloroethylene and 0.5 cc. of dimethylformamide, 0.5 cc. of $POCl_3$ were added and the mixture was stirred for 30 minutes at room temperature. Always under stirring, 1.46 g. of 3-(4'-chlorobutoxy) - 9α-fluoro-$\Delta^{3,5}$-pregnadien-17α,21-diol-11,20-dione-21-acetate, 2 cc. of dimethylformamide and 5 cc. of trichloroethylene were added. The mixture was thereafter stirred for 4 hours at room temperature. The mixture was cooled to 0° C. and 0.5 g. of sodium acetate in 5 cc. of water were added under stirring for 30 minutes. It was then diluted with water and the preparation was carried out further as in Example 14. 0.5 g. of product were obtained melting at 195–200° C. The analytic sample melts at 203–206° C.

$\lambda_{max.}^{ethanol}$ 222, 328 m$\mu$;

$\epsilon$=12,300, 16,000; $[\alpha]_D^{20}$=+6.4° (c.=in chloroform).

EXAMPLE 17

*3-(2',3'-dichloropropoxy)-6-formyl-9α-fluoro-$\Delta^{3,5}$-pregnadien-17α,21-diol-11,20-dione-21-acetate*

3-(2',3'-dichloroproproxy) - 9α - fluoro-$\Delta^{3,5}$-pregnadien-17α,21-diol-11,20-dione-21-acetate was prepared by operating as in Example 14, but employing 2,3-dichloropropyl orthoformate. The crude product was then used for the following reaction. To a solution cooled to 0° C. of 16 cc. of trichloroethylene and 2 cc. of dimethylformamide, 2 cc. of $POCl_3$ were added. The mixture was then stirred for 30 minutes at room temperature. Always under stirring, 4.17 g. of 3-(2',3'-dichloropropoxy)-9α-fluoro - $\Delta^{3,5}$ - pregnadien - 17α,21 - diol - 11,20-dione-21-acetate, 8 cc. of trichloroethylene and 8 cc. of dimethylformamide were added. The mixture was stirred at room temperature for 4 hours. After cooling to 0° C., a solution of 4 g. of sodium acetate in 12 cc. of water was added to the reaction mixture under stirring for 30 minutes. The mixture was diluted with water and the preparation was then carried out as in Example 14. The product obtained after recrystallization from acetone-petroleum ether melts at 209–215° C. The analytic sample melts at 215–218° C.

$\lambda_{max.}^{ethanol}$ 220, 324 m$\mu$; $\epsilon$=13,400, 18,500.

EXAMPLE 18

*3-(2'-fluoroethoxy)-6-formyl-9α,11β,dichloro-$\Delta^{3,5}$-pregnadien-17α,21-diol-20-one-21-acetate*

The intermediate enolether 3-(2'-fluoroethoxy)-9α,11β-dichloro-$\Delta^{3,5}$-pregnadien - 17α,21 - diol-20-one-21-acetate was prepared from β-fluoroethyl orthoformate and 1.25 g. of 9α,11β-dichloro-$\Delta^4$-pregnen-17α,21-diol-3,20-dione-21-acetate (J. Am. Chem. Soc., 82, 1960, p. 4005) by operating as in Example 14. The crude product was employed as such for the following reaction. To a solution cooled to 0° C. of 1.25 cc. of trichloroethylene and 1.5 cc. of dimethylformamide, 0.75 cc. of $POCl_3$ were added and stirred for half an hour at room temperature. Always under stirring, the above crude enolether dissolved in 14 cc. of trichloroethylene was added. The reaction mixture was kept under stirring for 4–5 hours at room temperature. After cooling to 0° C., a solution of 1.6 g. sodium acetate in 25 cc. of water was added under stirring for 30 minutes. The solution was extracted with ethyl acetate. The extracts were washed with water, dried over anhydrous sodium sulfate, and evaporated. The residue was recrystallized from acetone/petroleum ether and 0.400 g. of the product were obtained melting at 224–226° C.

$\lambda_{max.}^{ethanol}$ 220 and 330 m$\mu$;

$\epsilon$=11,700, 17,900. By further recrystallization, the analytic sample was obtained melting at 227–229° C.

EXAMPLE 19

*3-(2'-fluoroethoxy)-6-formyl-9α-fluoro-$\Delta^{3,5}$-pregnadien-11β,16α,17α,21-tetrol-20-one-16,17-acetonide-21-acetate*

The intermediate enolether 3-(2'-fluoroethoxy)-9α-fluoro-$\Delta^{3,5}$-pregnadien-11β,16α,17α,21-tetrol - 20 - one-16,17-acetonide-21-acetate was prepared from 1 g. of 9α-fluoro-$\Delta^4$-pregnen - 11β,16α,17α,21-tetrol-3,20-dione-16,17-acetonide-21-acetate (prepared as described in J. Amer. Chem. Soc. 83, 1961, p. 2586), by operating as above. 0.750 g. of the product were obtained melting at 185–187° C., which were used as such for the following reaction. To a solution cooled to 0° C. of 4 cc. of chloroform and 0.25 cc. of dimethylformamide, 0.25 cc. of $POCl_3$ were added, whereupon 0.500 g. of the above crude enolether were added. The reaction mixture was kept under stirring for 4 hours at room temperature. After cooling to 0° C., a solution of 0.5 g. of sodium acetate in 2 cc. of water was added. The mixture was extracted with ethyl acetate, the extract washed with water, with a 5% sodium bicarbonate solution and then with water to neutrality and the solvent was distilled off in vacuo. From the residue, by adding ethyl ether/petroleum ether, 0.2 g. of 3-(2'-fluoroethoxy)-6-formyl-9α-fluoro-Δ$^{3,5}$-pregnadien-11β,16α,17α,21-tetrol-20-one-16,17-acetonide-21-acetate crystallized, melting at 215–217° C.

$\lambda_{max.}^{ethanol}$ 216, 324 mμ; ε=10,060 and 16,400.

EXAMPLE 20

*3-(2'-chloroethoxy)-6-formyl-9α-fluoro-Δ$^{3,5}$-pregnadien-11β,16α,17α,21-tetrol-20-one-16,17-acetonide-21-acetate*

The intermediate enolether 3-(2'-chloroethoxy)-9α-fluoro-Δ$^{3,5}$-pregnadien-11β,16α,17α,21 - tetrol - 20-one-16,17-acetonide-21-acetate was prepared from 2 g. of 9α-fluoro-Δ$^4$-pregnen-11β,16α,17α,21-tetrol - 3,20-dione-16,17-acetonide-21-acetate, by operating as above. 1.66 g. of product were obtained, melting at 158–160° C., which was used as such for the following reaction. To a solution cooled to 0° C. of 6.5 cc. of trichloroethylene and 0.85 cc. of dimethylformamide, 0.85 cc. of phosphorus oxychloride were added. The mixture was then stirred for half an hour at room temperature, whereupon 1.66 g. of the above crude enolether were added. The reaction mixture was kept under stirring for 4 hours at room temperature. After cooling to 0° C., a solution of 1.66 g. of sodium acetate in 6.5 cc. of water was added. The mixture was extracted with ethylether, the extract was washed with a 5% sodium bicarbonate solution and then with water until neutrality and the solvent was distilled off in vacuo. From the residue, by adding ethyl ether/petroleum ether, 0.915 g. of 3-(2'-chloroethoxy)-6-formyl-9α-fluoro-Δ$^{3,5}$-pregnadien-11β,16α,17α,21-tetrol-20-one-16,17-acetonide-21-acetate crystallized, melting at 180–182° C.

$\lambda_{max.}^{ethanol}$ 217, 323 mμ;

ε=12,100, 17,100. [α]$_D^{20}$=+26° (c.=1 in chloroform).

EXAMPLE 21

By operating as described in the previous examples, the following compounds were also obtained:

3-(4'-chlorobutoxy)-6-formyl - 9α - chloro-3,5-pregnadien-11β,17α,21-triol-20-one-21-acetate, melting at 200–203° C.;

$\lambda_{max.}^{ethanol}$ 217, 328 mμ;

3(2'-bromoethoxy)-6-formyl - 9α - chloro-3,5-pregnadien-11β,17α,21-triol-20-one-21-acetate, melting at 210–215° C.;

$\lambda_{max.}^{ethanol}$ 217, and 326 mμ.

By operating with the same conditions as described in the preceding examples but substituting another chlorinating agent, such as phosgene, phosphorus pentachloride or thionyl chloride, for the phosphorus oxychloride; and if substituting diethylformamide or methylethylformamide for the dimethylformamide and using chloroform, dichloroethane or carbon tetrachloride as solvent, the described compounds are obtained analogously. By replacing the above starting 11-acetate and/or 21-acetate compounds with other acyl derivatives of an organic carboxylic acid having no more than 9 carbon atoms, such as propionate, butyrate, valerianate, caproate, octanoate, cyclopentylpropionate, the corresponding 11- and/or 21-acyl derivatives are obtained.

*Pharmacology.*—The antiinflammatory activity of the products of the invention has been determined according to the method described by Robert A. et al. (Acta Endocrinol. 25, 1957, p. 105–112) on albino rats. The products have been only once administered by local route (Selye pouch) on 8–10 animal groups.

In the following table the values of relative effective dose 50, that is the dose which inhibits 50% of the inflammatory exudate of some new compounds of the invention are reported in comparison with that of hydrocortisone acetate stated equal to one.

TABLE

| | Relative effective dose 50 |
|---|---|
| Hydrocortisone acetate | 1 |
| 3-(2'-chloroethoxy)-9α-fluoro-6-formyl-3,5-pregnadien-11β,17α,21-triol-20-one-11-formate-21-acetate | 35.0 |
| 3-(2'-chloroethoxy)-6-formyl-9α-fluoro-3,5-pregnadien-17α,21-diol-11,20-dione-21-acetate | 90.0 |
| 3-(2'-chloroethoxy)-6-formyl-9α-fluoro-3,5-pregnadien-11β,16α,17α,21-tetrol-20-one-21-acetate-16α,17α-acetonide | 270.0 |
| 3-(2'-chloroethoxy)-6-formyl-9α-chloro-3,5-pregnadien-11β,17α,21-triol-20-one-21-acetate | 54.0 |
| 3-(2'-bromoethoxy)-6-formyl-9α-fluoro-3,5-pregnadien-17α,21-diol-11,20-dione-21-acetate | 180.0 |
| 3-(2'-fluoroethoxy)-6-formyl-9α-fluoro-3,5-pregnadien-17α,21-diol-11,20-dione-21-acetate | 27.5 |
| 3-(2'-fluoroethoxy)-6-formyl-9α-fluoro-3,5-pregnadien-11β,16α,17α,21-tetrol-20-one-16α,17α-acetonide-21-acetate | 52.0 |
| 3-(4'-chlorobutoxy)-6-formyl-9α-fluoro-3,5-pregnadien-17α,21-diol-11,20-dione-21-acetate | 166.0 |
| 3-(2',3'-dichloropropoxy)-6-formyl-9α-fluoro-3,5-pregnadien-17α,21-diol-11,20-dione-21-acetate | 180.0 |
| 3-(4'-chlorobutoxy)-6-formyl-9α-chloro-3,5-pregnadien-11β,17α,21-triol-20-one-21-acetate | 34.0 |
| 3-(2'-bromoethoxy)-6-formyl-9α-chloro-3,5-pregnadien-11β,17α,21-triol-20-one-21-acetate | 45.5 |

We claim:
1. A process for preparing steroids of the formula:

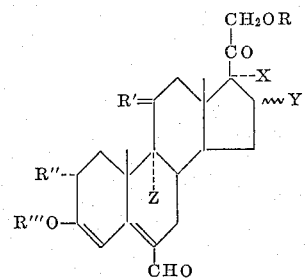

wherein R is an acyl group of a carboxylic acid having up to 9 carbon atoms;
R' is selected from the group consisting of (αH)βCl, O, (αH)βOH, and (αH)βOR wherein R has the above meaning;
R'' is selected from the group consisting of H and CH$_3$;
R''' is T–A where T is F, Cl, Br and A is a straight alkylene radical which may be substituted with chlorine and having from 2 to 8 carbon atoms;
X is selected from the group consisting of H and OH;
Y is selected from the group consisting of H, αOH, αCH$_3$ and βCH$_3$;
X and Y together may form the group

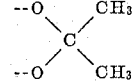

Z is selected from the group consisting of F and Cl, which comprises reacting a compound of the formula:

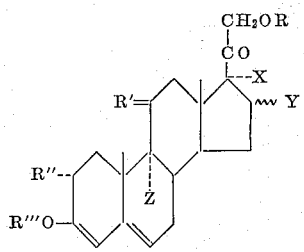

wherein R, R', R'', R''', X, Y and Z have the above meaning, dissolved in a chlorinated organic solvent, with a formamide selected from the group consisting of a dialkyl formamide, an alkylaryl formamide and a cyclic formamide wherein the nitrogen atom is a member of a cyclic ring, and a chlorinating agent selected from the group consisting of phosphorus oxychloride, phosgene, phosphorus pentachloride and thionyl chloride at about room temperature and isolating the resulting product by weak alkaline hydrolysis of the reaction mixture.

2. A process for preparing steroids of the formula:

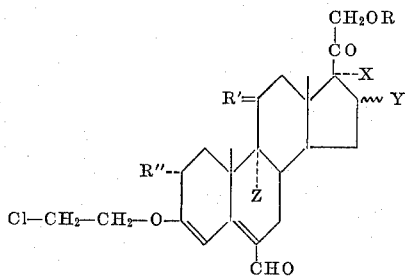

wherein R is a radical of an organic carboxylic acid having no more than 9 carbon atoms;
R' is selected from the group consisting of $(\alpha H)\beta Cl$, O, $(\alpha H)\beta OH$, $(\alpha H)\beta OR$ wherein R has the above meaning;
R'' is selected from the group consisting of H and $CH_3$;
X is selected from the group consisting of H and OH.
Y is selected from the group consisting of H, $\alpha OH$, $\alpha CH_3$ and $\beta CH_3$;
X and Y may be part of the group

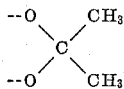

Z is selected from the group consisting of F and Cl, which comprises reacting a compound of the formula:

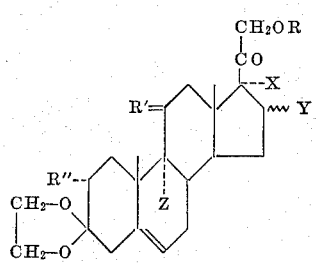

wherein R, R', R'', X, Y and Z have the above meaning, dissolved in a chlorinated organic solvent, with a formamide selected from the group consisting of a dialkyl formamide, an alkylaryl formamide and a cyclic formamide, wherein the nitrogen atom is a member of the cyclic ring, and with a chlorinating agent selected from the group consisting of phosphorus oxychloride, phosgene, phosphorus pentachloride, thionyl chloride, at a temperature from 40° to 80° C., and isolating the resulting product by weak alkaline hydrolysis of the reaction mixture.

3. A steroid compound of the formula:

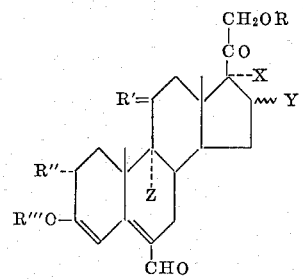

wherein R is an acyl group of a carboxylic acid having up to 9 carbon atoms;

R' is selected from the group consisting of $(\alpha H)\beta Cl$, O, $(\alpha H)\beta OH$, $(\alpha H)\beta OR$ wherein R has the above meaning;
R'' is selected from the group consisting of H and $CH_3$;
R''' is T-A where T is F, Cl, Br and A is a linear alkylene radical which may be substituted with chlorine and having from 2 to 8 carbon atoms;
X is selected from the group consisting of H and OH;
Y is selected from the group consisting of H, $\alpha OH$, $\alpha CH_3$ and $\beta CH_3$;
X and Y together may form the group

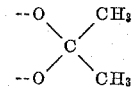

Z is selected from the group consisting of F and Cl.

4. 3 - (2' - chloroethoxy)-9α-fluoro-6-formyl-3,5-pregnadien-11β,17α,21-triol-20-one-21-acetate.

5. 3 - (2' - chloroethoxy) - 9α - fluoro-6-formyl-3,5-pregnadien - 11β,17α,21 - triol - 20 - one-11-formate-21-acetate.

6. 3 - (2' - chloroethoxy) - 6 - formyl - 9α-fluoro-3,5-pregnadien-17α,21-diol-11,20-dione-21-acetate.

7. 3-(2'-chloroethoxy)-6 - formyl-9α - fluoro-3,5-pregnadien-11β,16α,17α,21-tetrol-20-one-21-acetate - 16α,17α, acetonide.

8. 3-(2'-chloroethoxy)-6 - formyl-9α - fluoro-3,5-pregnadien-11β,17α,21-triol-20-one-11β,21-diacetate.

9. 3-(2' - chloroethoxy)-6 - formyl-16α - methyl-9α-fluoro-3,5 - pregnadien - 11β,17α,21 - triol-20-one - 21-acetate.

10. 3-(2'-chloroethoxy) - 6 - formyl - 16β - methyl-9α-fluoro-3,5-pregnadien-11β,17α,21-triol-20-one-21-acetate.

11. 3-(2' - chloroethoxy) - 6 - formyl-9α,11β-dichloro-3,5-pregnadien - 17α,21 diol - 20-one-21-acetate.

12. 3-(2' - chloroethoxy) - 6 - formyl-9α-chloro-3,5-pregnadien-11β,17α,21-triol-20-one-21-acetate.

13. 2α-methyl-3-(2'-chloroethoxy)-6-formyl-9α-fluoro-3,5-pregnadien-11β,17α,21-triol-20-one-21-acetate. pregnadien-17α,21-diol-11,20-dione-21-acetate.

14. 2α - methyl - 3 - (2'-chloroethoxy) - 6 - formyl-9α-chloro - 3,5 - pregnadien - 11β,17α,21 - triol-20-one-21-acetate.

15. 3-(2' - chloroethoxy) - 6 - formyl-9α - fluoro-3,5-pregnadien-11β,21-diol-20-one-21-acetate.

16. 3-(2'-chloroethoxy)-6 - formyl - 9α - fluoro-3,5-pregnadien-21-ol-11,20-dione-21-acetate.

17. 3-(2'-bromoethoxy) - 6 - formyl - 9α-fluoro-$\Delta^{3,5}$-pregnadien-17α,21 - diol-11,20-dione-21-acetate.

18. 3-(2'-fluoroethoxy)-6 - formyl - 9α - fluoro-$\Delta^{3,5}$-pregnadien-17α,21-diol-11,20-dione-21-acetate.

19. 3-(4' - chlorobutoxy) - 6 - formyl - 9α - fluoro-$\Delta^{3,5}$-pregnadien-17α,21-diol-11,20-dione-21-acetate.

20. 3-(2',3' - dichloropropoxy) - 6 - formyl-9α-fluoro-$\Delta^{3,5}$-pregnadien-17α,21-diol-11,20-dione-21-acetate.

21. 3-(2'-fluoroethoxy) - 6 - formyl - 9α,11β - dichloro-$\Delta^{3,5}$-pregnadien-17α,21-diol-20-one-21-acetate.

22. 3-(2' - fluoroethoxy) - 6 - formyl-9α-fluoro-$\Delta^{3,5}$-pregnadien - 11β,16α,17α,21 - tetrol - 20 - one - 16,17-acetonide-21-acetate.

23. 3-(4' - chlorobutoxy) - 6 - formyl - 9α-chloro-$\Delta^{3,5}$-pregnadien-11β,17α,21-triol-20-one-21-acetate.

24. 3-(2' - bromoethoxy) - 6 - formyl - 9α - chloro-3,5-pregnadien-11β,17α,21-triol-20-one-21-acetate.

No references cited.

LEWIS GOTTS, *Primary Examiner.*

HENRY A. FRENCH, *Assistant Examiner.*